Aug. 28, 1923.
F. H. ROYCE
1,466,549
BRAKE FOR VEHICLES
Filed Oct. 10, 1922
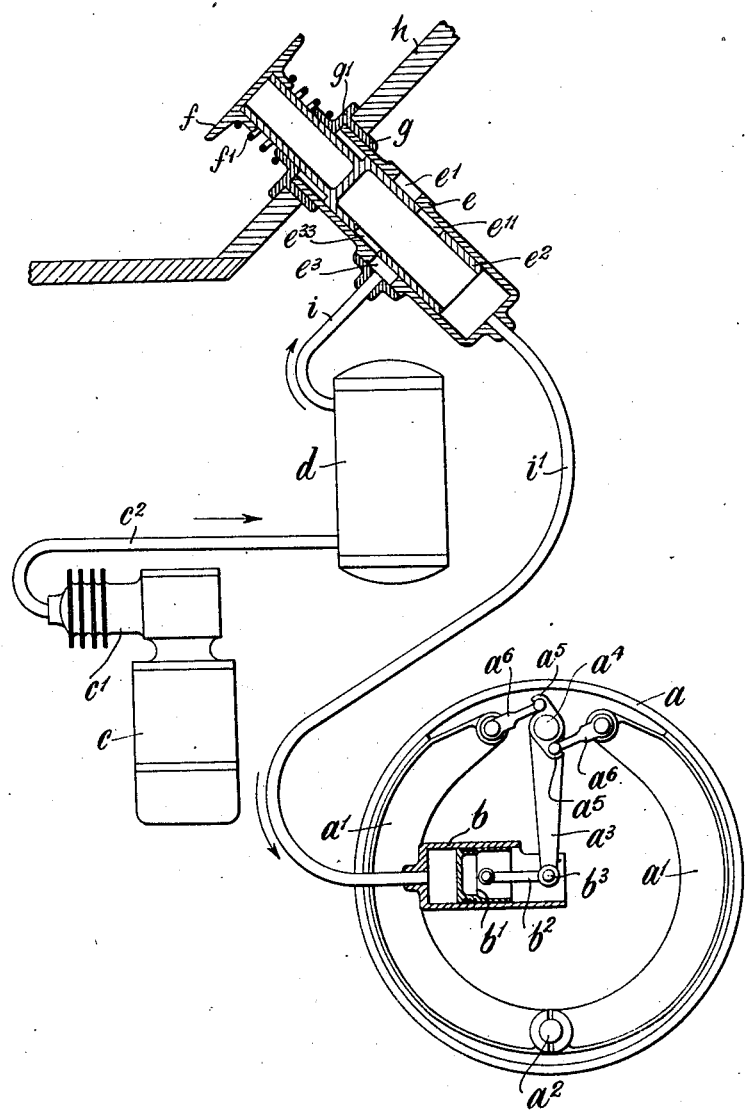
Inventor:
Frederick Henry Royce.
Attorney:

Patented Aug. 28, 1923.

1,466,549

UNITED STATES PATENT OFFICE.

FREDERICK HENRY ROYCE, OF DERBY, ENGLAND, ASSIGNOR TO ROLLS ROYCE LIMITED, OF DERBY, ENGLAND, A COMPANY OF GREAT BRITAIN.

BRAKE FOR VEHICLES.

Application filed October 10, 1922. Serial No. 593,543.

*To all whom it may concern:*

Be it known that I, FREDERICK HENRY ROYCE, residing at Derby, England, a subject of the King of Great Britain and Ireland, have invented certain new and useful Improvements in Brakes for Vehicles, of which the following is a specification.

This invention relates to the operating and controlling of brakes on road vehicles and is useful more especially in cases of four-wheeled vehicles with a brake on each wheel, said brakes being brought into operation by a pedal or other appliance.

A common method of constructing brakes for the wheels of vehicles is to attach a drum to each of the wheels to be braked and to provide within the rim or periphery of the drum an annular metal ring directly or indirectly attached to the frame of the vehicle so as not to be rotatable, with normally a small clearance between the rim or periphery of the drum and the ring and with some mechanical means whereby the ring can be expanded and caused to come into contact with the rim or periphery of the drum. In the common form the ring is made in two equal parts or sections commonly called shoes, two adjacent ends of the sections being hinged while the other two adjacent ends are connected to a mechanism whereby they can be forced apart to cause a general expansion of the circumference of the ring.

In brakes hitherto in vogue the expansion of the ring has been effected mechanically or through the instrumentality of a pneumatic or fluid medium.

One of the difficulties of a braking system, especially when it operates on all four wheels of the vehicle and is pedal-operated, is that in order to provide a sufficient clearance of the brake shoes when the brake is in the "off" position, while at the same time securing a good leverage of mechanical advantage between the pedal and the brake shoes, an excessive and inconveniently large movement of the pedal lever is necessary.

Proposals have been made to overcome this difficulty by utilizing or bringing into play some other force in substitution for the force exerted by the driver who then only has to move a lever or other appliance for actuating the mechanism. For the purposes of road vehicles, it is of great importance that the driver shall feel from the moment he puts on the brake a direct resistance, bearing a constant ratio to the pressure being exerted on the shoes; and the exigencies of a four-wheel road vehicle render it imperative or highly desirable that the pedal and valve controlling the pneumatic force should be located away from and be independent of the pressure cylinder or cylinders directly actuating the brake shoes. But in most of these devices the driver does not feel the brake pressure which is being applied and it is rendered more difficult for him to adjust it accordingly.

The object of this invention is to overcome this difficulty and to provide an improved mechanism for actuating the brakes.

According to this invention a source of pneumatic or fluid pressure is provided and is applied through the action of a special valve operated by a pedal or other appliance to actuate the brake mechanism with the force required, and synchronously offering to the movement of the valve mechanism a resistance of a predetermined ratio to the force applied to the brake mechanism, so that although the driver by a comparatively small movement of the lever can bring to bear all the force required, he still feels the extent of the force applied and the adjustment of the degree of pressure is facilitated.

An example of the invention is shown in sectional diagram in the accompanying drawing in which, $a$ designates the rim of the drum attached to an associated wheel; $a^1$ the sections of the brake or shoes hinged at $a^2$. $a^3$ is a lever moving on a fulcrum $a^4$ and having extensions $a^5$ in which are formed recesses to take the ends of connecting members $a^6$ which are hinged to the other ends of the shoes.

$b$ designates a pressure cylinder in which is a piston $b^1$ connected by the connecting rod $b^2$ to the aforesaid lever $a^3$ and pivoted thereto at $b^3$. $c$ designates an electric motor operating a pump $c^1$ which through the pipe $c^2$ effects compression of air in the reservoir $d$.

The valve mechanism comprises a cylinder $e$ having an exhaust port $e^1$ and an inlet port $e^3$ and containing a hollow cylindrical piston $e^2$ with corresponding ports $e^{11}$ and $e^{33}$. $f$ designates a foot pedal connected to or formed as an extension of the piston $e^2$. The cylinder $e$ and pedal $f$ are held in a sleeve $g$ (to which the cylinder $e$ is rigidly attached) with a flange $g^1$ which is supported in the footboard $h$ of the vehicle. $f^1$ designates a helical spring by which the pedal, when released, is returned to its normal position and $i$ and $i^1$ are pipes connecting the reservoir $d$ and pressure cylinder $b$ respectively to the cylinder $e$.

Normally the ports $e^1$ and $e^{11}$ register and no pressure is exerted on the brake mechanism. When the pedal is depressed these ports are brought out of register and are closed while further depression of the pedal causes the port $e^{33}$ to register with the port $e^3$. Directly the ports $e^3$ and $e^{33}$ are in register, pressure is applied to the cylinder $b$, and to the reverse side of the piston $e^2$ in cylinder $e$. This pressure is always below the pressure in the reservoir $d$ owing to leakage of air past the pistons $b^1$ and $e^2$, and hence the degree of pressure in the cylinder $b$ and that applied to the shoes, and the pressure against the piston $e$ are dependent on the extent to which the port $e^3$ is open. The ratio of pressure exerted on the brake shoes and the pressure exerted against the piston $e$ is dependent on the mechanical advantage of the leverages secured by the lever $a^3$ and the ratio of the cross sectional area of the piston $b^1$ to that of the piston $e^2$.

It is not necessary to have a separate pressure cylinder for each brake. One such cylinder could be arranged with mechanical connections to the different brakes. Further, the invention is not limited to the particular kind of brake described. It could be applied to various other forms.

It has been proposed in connection with brakes for cranes and such like, and in which a pneumatic force is applied, to so arrange the mechanism that when the pneumatic force is applied, a resistance is felt by the operator; but in one form of mechanism through the instrumentality of a metal spring, and in another form with the valve as part of the same unit as the pressure cylinder directly operating the brake.

It has also been proposed in a brake for road vehicles to apply pneumatic force and to so arrange the mechanism that when the force is applied, resistance is felt by the driver, but through the instrumentality of a metal spring.

None of these mechanisms or arrangements would effect the ends of my invention which are specially required in reference to road vehicles, to wit: that when the pressure is applied, it directly resists the action of the operator, and that the resistance offered is in ratio to the force applied to the brake, and that the system is so composed as to render this practicable in a road vehicle.

What I claim as my invention and desire to secure by Letters Patent of the United States is:—

1. A pneumatic operating system, comprising a source of fluid pressure; a valve mechanism embodying a cylinder having inlet and exhaust ports in its walls, a hollow, cylindrical piston having inlet and exhaust ports adapted to be brought into and out of registration with the corresponding first-named ports, and an operating element connected to said piston; a pressure cylinder; a piston therein; a conduit leading from the source of pressure to the inlet port of the valve cylinder; and a separate conduit leading from the valve cylinder to the pressure cylinder for supplying pressure to the latter cylinder to operate the piston therein.

2. A pneumatic operating system, comprising a source of fluid pressure; a valve mechanism embodying a cylinder having inlet and exhaust ports in its walls, a hollow cylindrical piston having inlet and exhaust ports adapted to be brought into and out of registration with the corresponding first-named ports, and an operating element to which the piston is directly and rigidly connected; a pressure cylinder; a piston in the pressure cylinder mechanically connected to the part to be operated; a conduit leading from the source of pressure to the inlet port of the valve cylinder; and a separate conduit leading from the valve cylinder to the pressure cylinder for supplying pressure to the latter cylinder to operate the piston therein.

3. In a pneumatic operating system, the combination of a source of fluid pressure; a valve mechanism embodying a cylinder having an inlet port and separate exhaust and delivery ports, the exhaust port opening into the atmosphere, a hollow cylindrical piston having inlet and exhaust ports, means normally holding the piston in a position in which its inlet and exhaust ports are respectively disposed out of and in register with the corresponding cylinder ports, and an operating element for moving said piston into a position wherein its said inlet and exhaust ports are respectively alined with and disalined from the corresponding cylinder ports; a conduit leading from the source of pressure to the cylinder inlet port; and a separate conduit leading from the cylinder delivery port to the part to be operated.

4. In a pneumatic operating system, the combination of a source of fluid pressure; a valve mechanism embodying a cylinder having an inlet port and separate exhaust and delivery ports, the exhaust port opening into the atmosphere, a hollow cylindrical piston having inlet and exhaust ports, and a springcontrolled operating element, to which said piston is directly and rigidly connected, normally holding the piston in a position in which its inlet and exhaust ports are respectively disposed out of and in register with the corresponding cylinder ports but depressible into a position in which said piston ports are respectively alined with and disalined from the corresponding cylinder ports; a conduit leading from the source of pressure to the cylinder inlet port; and a separate conduit leading from the cylinder delivery port to the part to be operated.

In witness whereof I have signed this specification.

FREDERICK HENRY ROYCE.